United States Patent
Yen

(10) Patent No.: US 12,071,795 B2
(45) Date of Patent: *Aug. 27, 2024

(54) HOLLOW HINGE AND ELECTRONIC DEVICE

(71) Applicant: Getac Technology Corporation, New Taipei (TW)

(72) Inventor: Li-Chuan Yen, Taipei (TW)

(73) Assignee: GETAC TECHNOLOGY CORPORATION, New Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/226,306

(22) Filed: Jul. 26, 2023

(65) Prior Publication Data

US 2023/0366250 A1 Nov. 16, 2023

Related U.S. Application Data

(63) Continuation of application No. 17/026,577, filed on Sep. 21, 2020, now Pat. No. 11,773,634.

(51) Int. Cl.
*E05D 11/00* (2006.01)
*G06F 1/16* (2006.01)

(52) U.S. Cl.
CPC ........ *E05D 11/0081* (2013.01); *G06F 1/1681* (2013.01); *E05Y 2900/606* (2013.01)

(58) Field of Classification Search
CPC ........... E05Y 2900/606; E05D 11/0081; E05D 11/10; G06F 1/1681
See application file for complete search history.

(56) References Cited

U.S. PATENT DOCUMENTS

| | | | |
|---|---|---|---|
| 5,143,468 A * | 9/1992 | Pausch | F16M 11/12 16/322 |
| 5,713,633 A * | 2/1998 | Lu | B60N 2/847 403/93 |
| 6,092,334 A * | 7/2000 | Kim | E05F 1/006 16/334 |
| 6,609,273 B1 * | 8/2003 | Yamada | F16C 11/02 16/386 |
| 7,440,783 B2 * | 10/2008 | Hyun | H04M 1/0222 455/575.8 |
| 7,526,835 B2 * | 5/2009 | Chen | G06F 1/1681 16/340 |

(Continued)

*Primary Examiner* — Christine M Mills
*Assistant Examiner* — Matthew J Sullivan
(74) *Attorney, Agent, or Firm* — Locke Lord LLP; Tim Tingkang Xia, Esq.

(57) ABSTRACT

A hollow hinge includes a first hollow component, a second hollow component and a plurality of support assemblies. The first hollow component has a first surface and a second surface opposite to the first surface, and a plurality of concave portions are disposed on the second surface. The second hollow component is disposed on the second surface of the first hollow component and a plurality of receiving portions corresponding to the concave portions are disposed on the second hollow component. The support assemblies are respectively contained in the receiving portions and continuously butt against the first hollow component through a force. The hollow hinge avoids friction between components and strengthens support, thereby prolonging durability and improving assembly and production yield rate.

9 Claims, 6 Drawing Sheets

(56) References Cited

U.S. PATENT DOCUMENTS

| | | | | |
|---|---|---|---|---|
| 7,581,291 B2* | 9/2009 | Abe | ............... | G06F 1/162 |
| | | | | 16/302 |
| 7,614,119 B2* | 11/2009 | Hsu | ............... | E05D 3/10 |
| | | | | 16/367 |
| 7,621,021 B2* | 11/2009 | Hsu | ............... | G06F 1/162 |
| | | | | 16/340 |
| 7,735,197 B2* | 6/2010 | Chien | ............... | H04M 1/0216 |
| | | | | 16/337 |
| 8,082,632 B2* | 12/2011 | Bae | ............... | H05K 5/0226 |
| | | | | 16/376 |
| 8,186,017 B2* | 5/2012 | Lin | ............... | G06F 1/1681 |
| | | | | 16/334 |
| 9,782,022 B2* | 10/2017 | Atkins | ............... | F16M 11/10 |
| 10,415,285 B1* | 9/2019 | Anderson | ............... | A47F 10/06 |
| 10,519,702 B2* | 12/2019 | Longerich | ............... | E05D 7/1016 |
| 10,767,405 B1* | 9/2020 | Anderson | ............... | E05D 1/00 |
| 11,773,634 B2* | 10/2023 | Yen | ............... | G06F 1/1622 |
| | | | | 16/223 |
| 2007/0119024 A1* | 5/2007 | Kim | ............... | H04M 1/0227 |
| | | | | 16/337 |
| 2008/0155782 A1* | 7/2008 | Chang | ............... | G06F 1/1681 |
| | | | | 16/224 |
| 2020/0325715 A1* | 10/2020 | Sengstaken, Jr. | ............... | E05F 15/614 |

\* cited by examiner

HOLLOW HINGE AND ELECTRONIC DEVICE

CROSS-REFERENCE TO RELATED PATENT APPLICATION

This non-provisional application is a Continuation application of U.S. patent application Ser. No. 17/026,577, currently pending, the disclosure of which is incorporated herein in its entirety by reference.

BACKGROUND OF THE INVENTION

Field of the Invention

The present invention relates to a hollow hinge, and more particularly to a hollow hinge with support assemblies.

Description of the Prior Art

A conventional hollow hinge is mostly applied to connect two electronic modules. In addition to having relative rotation, the two connected electronic modules further includes wires in between for transmitting electronic signals. A hollow part of the hollow hinge is for accommodating the wires.

However, with respect to the design of a commercial hollow hinge, internal bump structures are configured to control torque. Once having been used for an extended period of time, torque is reduced as a result of abrasion of the bump structures, causing issues of wavering and friction at the same time.

SUMMARY OF THE INVENTION

In view of the described issues, a hollow hinge provided according to an embodiment of the present invention includes a first hollow component, a second hollow component and a plurality of support assemblies. The first hollow component has a first surface and a second surface opposite to the first surface, and a plurality of concave portions are disposed on the second surface. The second hollow component is disposed on the second surface of the first hollow component and a plurality of receiving portions corresponding to the concave portions are disposed on the second hollow component. The support assemblies are respectively contained in the receiving portions, and end portions of the support assemblies continuously butt against the first hollow component through a force. In an initial state, the end portions butt against the concave portions.

An electronic device further provided according to another embodiment of the present invention includes a first housing, a second housing and the foregoing hollow hinge. The second housing is disposed opposite to first housing, and the hollow hinge is pivotally disposed between the first housing and the second housing.

In conclusion, according to the hollow hinge and the electronic device provided by the embodiments of the present invention, the friction between components is reduced by the support assemblies provided, thereby prolonging durability and improving product reliability. In addition, in contribution to the strengthening support structure, the issues of wavering and leaning during assembly are solved, further improving assembly and production yield rate.

Detailed features and advantages of the present invention are given in detail in the embodiments below. The contents given are sufficient for a person skilled in the art to understand the technical contents of the present invention and to carry out implementation accordingly. Moreover, according to the detailed description, claims and drawings disclosed by the application, a person skilled in the art would be easily to understand the objects and advantages of the present invention.

DETAILED DESCRIPTION OF THE EMBODIMENTS

Figure 1:
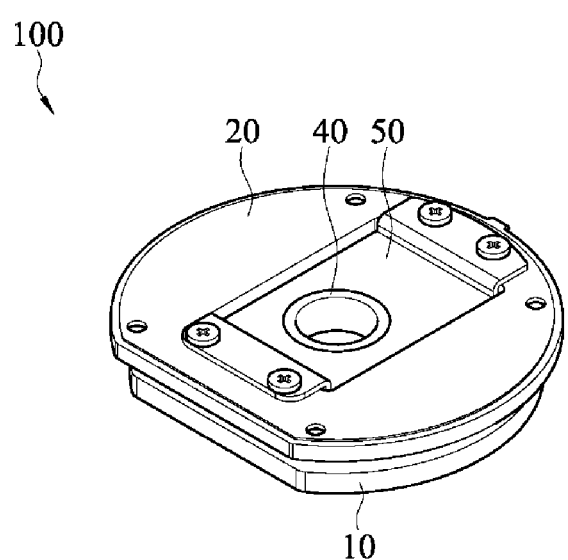
FIG. 1 is an appearance schematic diagram of a hollow hinge according to an embodiment of the present invention.
Figure 2:
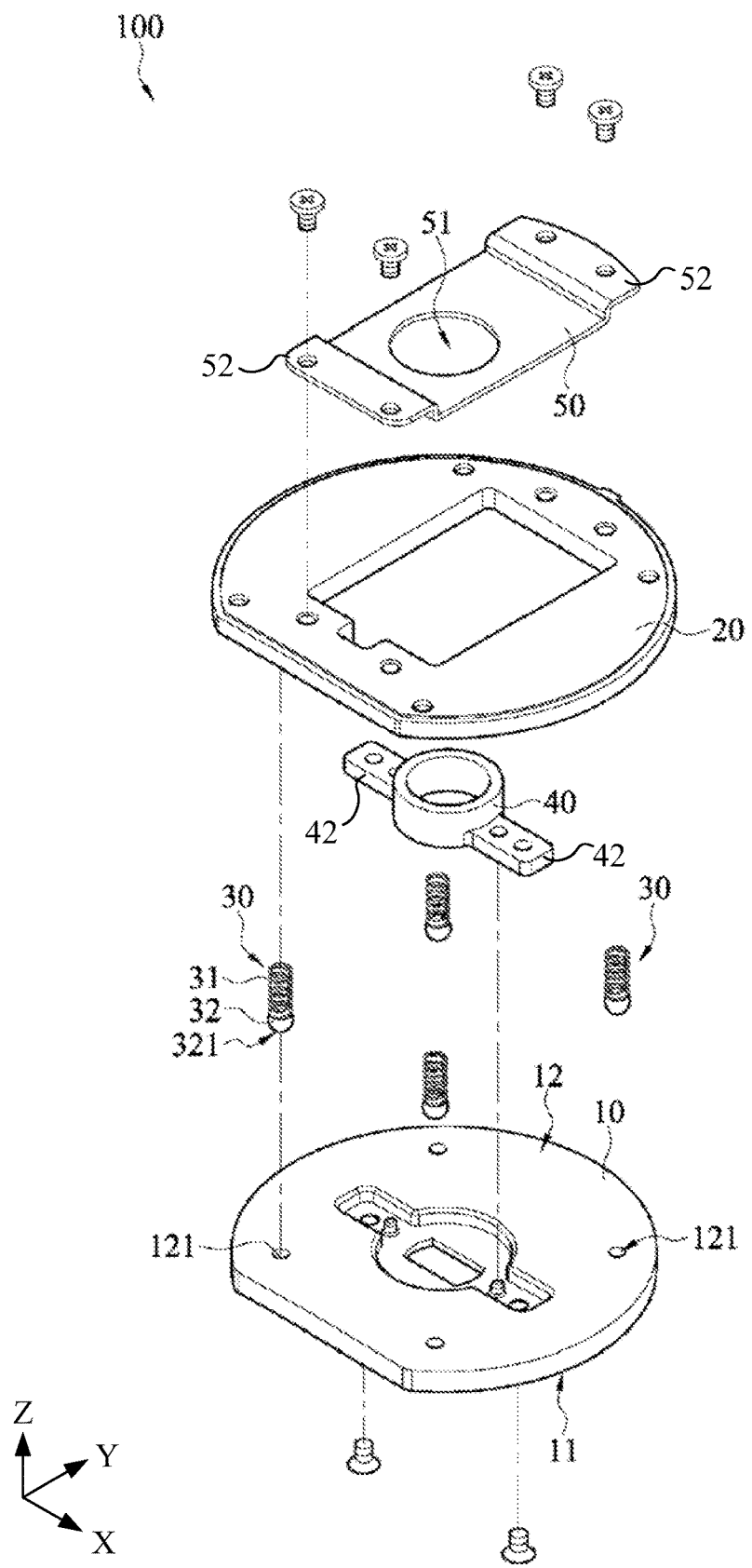
FIG. 2 is an exploded top view of a hollow hinge according to an embodiment of the present invention.
Figure 3:
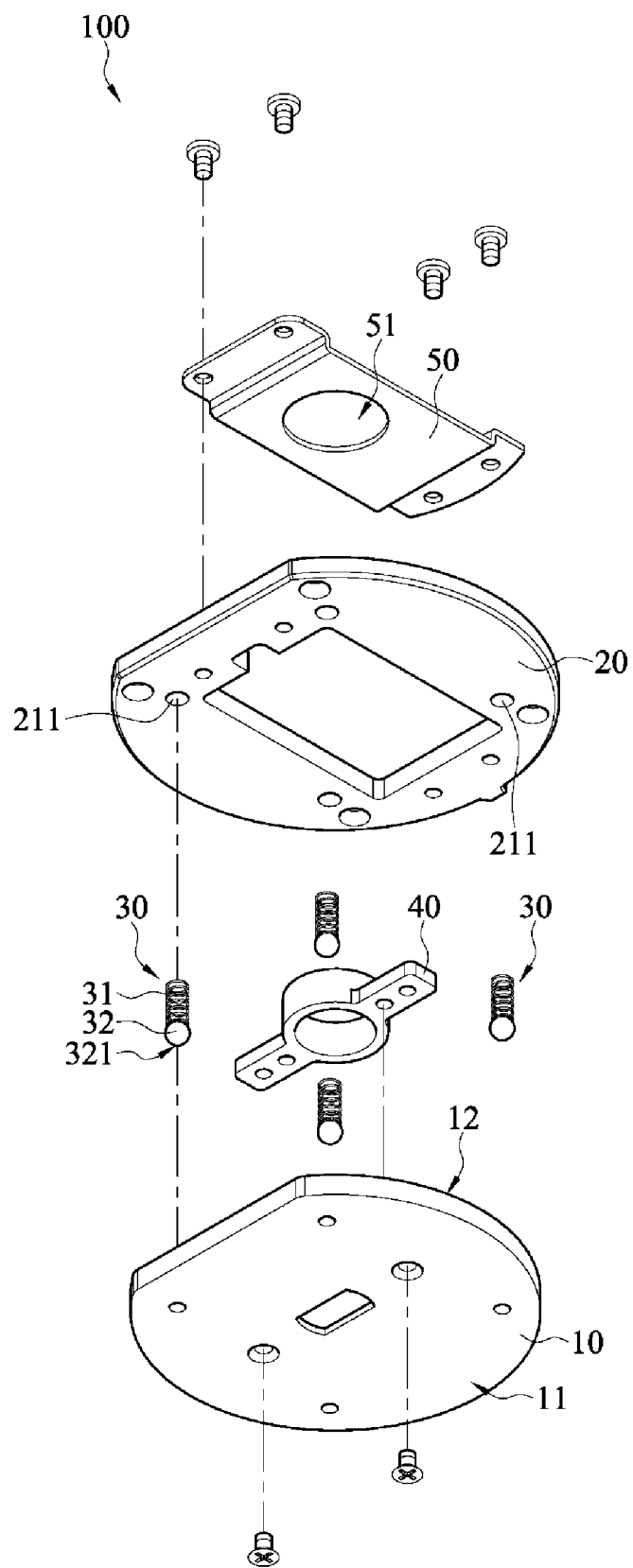
FIG. 3 is an exploded bottom view of a hollow hinge according to an embodiment of the present invention.

Refer to FIG. 1 to FIG. 3 showing a hollow hinge according to an embodiment of the present invention. FIG. 1 shows an appearance schematic diagram of a hollow hinge according to an embodiment of the present invention. FIG. 2 shows an exploded top view of a hollow hinge according to an embodiment of the present invention. FIG. 3 shows an exploded bottom view of a hollow hinge according to an embodiment of the present invention. As shown in FIG. 2, a hollow hinge 100 according to the embodiment includes a first hollow component 10, a second hollow component 20 and a plurality of support assemblies 30.

Referring to FIG. 2 and FIG. 3, in this embodiment, the first hollow component 10 has a first surface 11 and a second surface 12 on two opposite sides. It is seen from FIG. 2 that a plurality of concave portions 121 are disposed on the second surface 12, which are four concave portions 121 arranged in a rectangle as an illustrative example herein; however, the present invention is not limited to such example. In other implementation forms, for example, three concave portions 121 may be arranged in a triangle on the second surface 12. It is seen from FIG. 3, the second hollow component 20 is disposed on the second surface 12 of the first hollow component 10, and a plurality of receiving portions 211 corresponding to the concave portions 121 are disposed on the second hollow component 20. Here, the amount and the arranged way of the receiving portions 211 correspond to those of the concave portions 121. The plurality of support assemblies 30 are respectively contained in the receiving portions 211, and an end portion 321 on one side of each support assembly 30 continuously butts against the first hollow component 10 through a force. In an initial state, the end portions 321 of the support assemblies 30 butt against the concave portions 121 of the first hollow component 10, strengthening support with the plurality of support assemblies 30 provided, thereby solving the issues of relative wavering and leaning between the first hollow component 10 and the second hollow component 20 during assembly, and improving production yield rate.

As shown in FIG. 2 and FIG. 3, each support assembly 30 includes an elastic element 31 and a spherical element 32. The spherical element 32 is connected to the elastic element 31, the elastic element 31 provides a force, and the spherical element 32 butts against the first hollow component 10. In the state of use, by rotating the hollow hinge 100, the end portion 321 of the support assembly 30 departs the receiving portion 121 of the first hollow component 10. Moreover, with the structure of the support assembly 30, the elastic element 31 continuously provides a force for butting against the second surface 12 of the first hollow component 10, and the spherical element 32 reduces the friction between the first hollow component 10 and the second hollow component 20, thereby prolonging product durability.

In this embodiment, the spherical element 32 is connected to the elastic element 31 by means of, for example but not limited to, welding. In some implementation forms, the spherical element 32 may be assembled with the elastic element 31 by means of adhesion into the support assembly 30.

Further, in this embodiment, the support assembly 30 is, for example but not limited to, a discrete member. In some embodiments, the support assembly 30 may be an integral element.

In the embodiment shown in FIG. 2 and FIG. 3, the elastic element 31 is a spring, and the spherical element 32 is a steel ball; however, the present invention is not limited to the above examples. In some implementation forms, the elastic element 31 may be other elastic element capable of providing a force, and the spherical element 32 may be made of other rigid materials.

In this embodiment, the support assemblies 30 are provided as, for example but not limited to, four in quantity and are disposed corresponding to four concave portions 121 and four receiving portions 211. In some implementation forms, the support assemblies 30 may be in a quantity of an even number of two or more, and be symmetrically arranged. In some other implementation forms, the support assemblies 30 may be in a quantity of an odd number, and are equidistantly arranged so as to provide support between components.

Next, as shown in FIG. 2, the hollow hinge 100 of this embodiment further includes a first rotating member 40 and a second rotating member 50. The first rotating member 40 and the second rotating member 50 are sleeved corresponding to each other, and the first hollow component 10 and the second hollow component 20 are driven and rotated respectively by the first rotating member 40 and the second rotating member 50. The first rotating member 40 has two first wing portions 42 extending in a first direction X such that the two first wing portions 42 align with each other along the first direction X, and the second rotating member 50 has two second wing portions 52 extending in a second direction Y such that the two second wing portions 52 align with each other along the second direction Y. Both the first direction X and the second direction Y are substantially perpendicular to a vertical direction Z. The first wing portions 42 and the second wing portions 52 may be used for fixing purposes. Specifically, the first rotating member 40 is, for example, disposed at the first hollow component 10 by means of fastening with a screw penetrating through each of the first wing portions 42, and the second rotating member 50 is, for example, disposed on the second hollow component 20 also by means of fastening with a screw penetrating through each of the second wing portions 52. As shown in FIG. 2, the first direction X (i.e., the extending direction of the two first wing portions 42) is parallel to two sides of the rectangle arranged by the four concave portions 121, and the second direction Y (i.e., the extending direction of the two second wing portions 52) is parallel to two other sides of the rectangle arranged by the four concave portions 121. Moreover, the four concave portions 121 are arranged to be staggered from the first rotating member 40, such that each of the support assemblies 30 is located outside the first rotating member 40 and thus does not penetrate through the first rotating member 40.

Referring to FIG. 1, one end of the body of the first rotating member 40 is sleeved in an opening 51 of the second rotating member 50, and the portion of the opening 51 allows wires to pass through during configuration. For example, the hollow hinge 100 of this embodiment is applicable to an electronic device needing relative rotation movement, and wires for transmitting electronic signals are inserted through the hollow part of the hollow hinge 100. Further, the first rotating member 40 and the second rotating member 50 may also be sleeved relative to each other, such that the first hollow component 10 and the second hollow component 20 are capable of rotating around axes of the first rotating member 40 and the second rotating member 50 during relative rotation.

Figure 4:
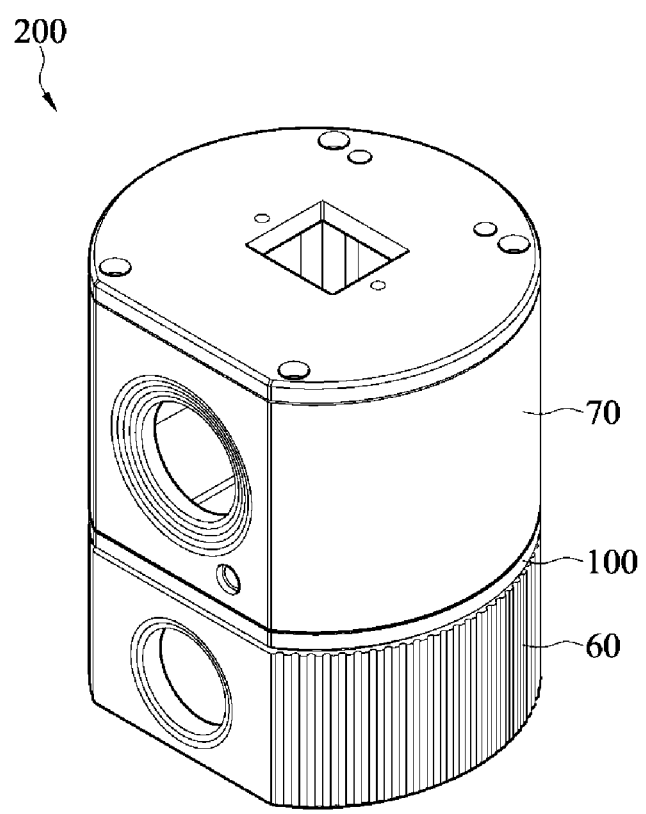
FIG. 4 is an appearance schematic diagram of an electronic device according to an embodiment of the present invention.
Figure 5:
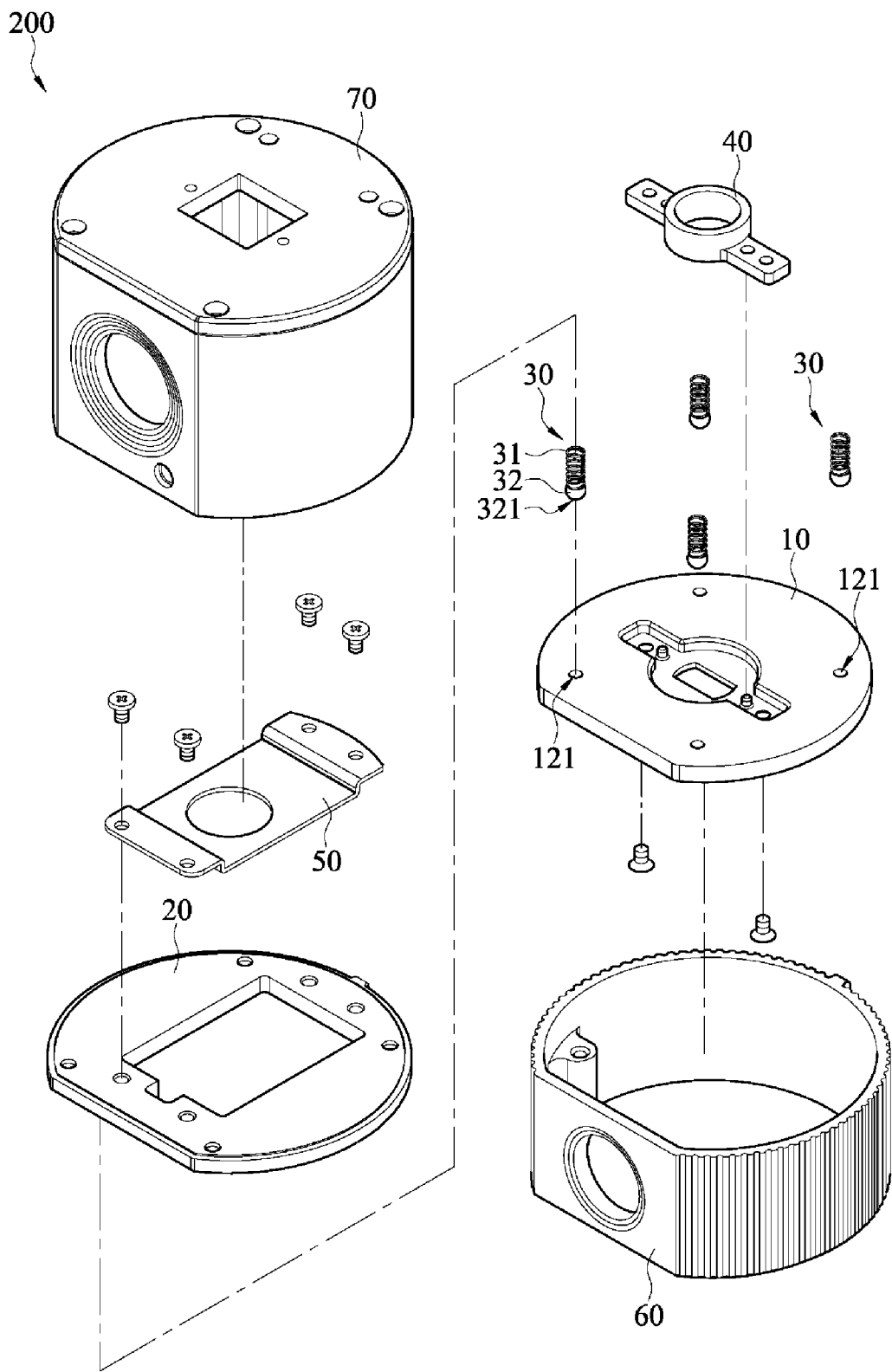
FIG. 5 is an exploded top view of an electronic device and a hollow hinge according to an embodiment of the present invention.
Figure 6:
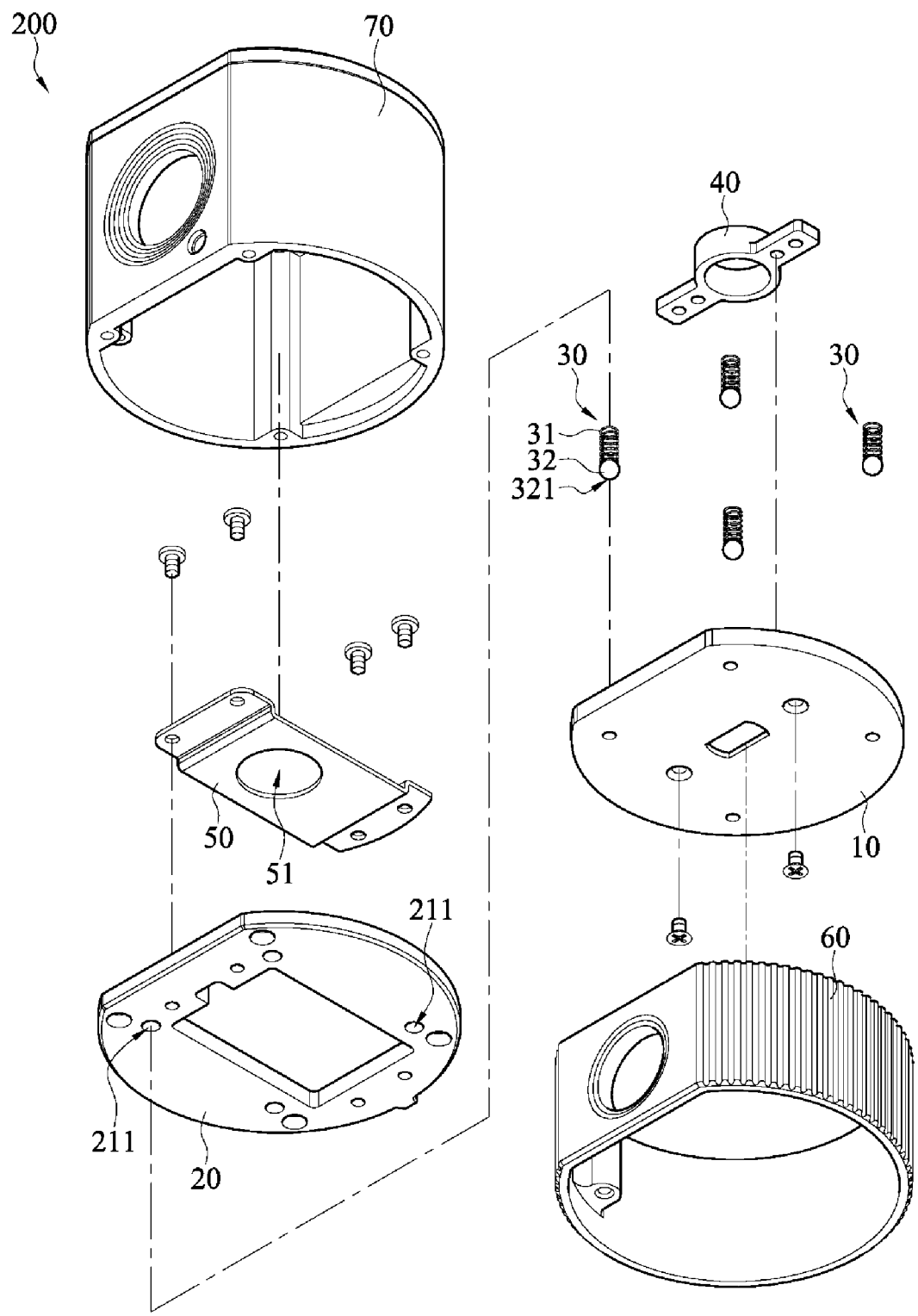
FIG. 6 is an exploded bottom view of an electronic device and a hollow hinge according to an embodiment of the present invention.

An electronic device 200 is further provided according to another embodiment of the present invention. The electronic device 200 includes a first housing 60, a second housing 70, and the hollow hinge 100 described in the foregoing embodiment. Refer to FIG. 4 to FIG. 6. FIG. 4 shows an appearance schematic diagram of an electronic device according to an embodiment of the present invention. FIG. 5 shows an exploded top view of an electronic device and a hollow hinge according to an embodiment of the present invention. FIG. 6 shows an exploded bottom view of an electronic device and a hollow hinge according to an embodiment of the present invention. The second housing 70 is disposed opposite to the first housing 60. The hollow hinge 100 is pivotally disposed between the first housing 60 and the second housing 70. The first housing 60 and the second housing 70 are capable of individually driving the hollow hinge 100 for relative rotation movement.

In one embodiment, for example, the electronic device 200 may be a laptop computer, and the hollow hinge 100 may be a shaft between a display and a keyboard. In another embodiment, for example but not limited to, the electronic device 200 may be an in-vehicle recorder, and the hollow hinge 100 may be a shaft connecting a camera lens and a button, and a user may rotate the camera lens through the hollow hinge 100.

In this embodiment, the first hollow component 10 is disposed at the first housing 60, and the second hollow component 20 is disposed at the second housing 70. Further, in addition to having relative relation movement, a joint of the first housing 60 and the second housing 70 further includes wires (not shown) for transmitting electronic signals between the first housing 60 and the second housing 70. At this point, the hollow part of the hollow hinge 100 may be used for accommodating the wires therein.

In conclusion, according to the hollow hinge 100 and the electronic device 200 provided by the embodiments of the present invention, with the support assemblies 30 provided, friction between components during relative rotation movement is reduced, thereby prolonging durability and improving product reliability. In addition, in contribution to the strengthening support structure, the issues of wavering and leaning during assembly are solved, further improving assembly and production yield rate.

While the invention has been described by way of example and in terms of the embodiments, it is to be understood that the invention is not limited thereto. Changes and modifications may be made by a person skilled in the art without departing from the spirit and scope of the present invention. Therefore, the scope of the appended claims of the invention should be accorded with the broadest interpretation of the appended claims of the application.

What is claimed is:

1. A hollow hinge, comprising:
a first hollow component, having a first surface and a second surface opposite to the first surface, a plurality of concave portions being disposed on the second surface;
a second hollow component, disposed on the second surface of the first hollow component, a plurality of receiving portions corresponding to the concave portions being disposed on the second hollow component;
a first rotating member, being disposed at the first hollow component, and having two first wing portions extending outward from a body of the first rotating member along a first direction, such that the two first wing portions align with each other along the first direction;
a second rotating member, being disposed at the second hollow component, and having two second wing portions extending outward from a body of the second rotating member along a second direction different from the first direction, wherein the body of the first rotating member is sleeved by the second rotating member, and the first hollow component and the second hollow component are driven and rotated by the first rotating member and the second rotating member; and
a plurality of support assemblies, accommodated in the receiving portions, respectively, one end portion of each of the plurality of support assemblies butting against the first hollow component through a force, the end portion of each of the plurality of support assemblies butting one of the plurality of concave portions in an initial state,
wherein the plurality of concave portions are arranged in a polygonal shape, the first direction is parallel to at least one side of the polygonal shape, and the second direction is parallel to at least one other side of the polygonal shape.

2. The hollow hinge according to claim 1, wherein each of the plurality of support assemblies comprises an elastic element and a spherical element, the elastic element provides the force, and the spherical element butts against the first hollow component along a third direction, wherein the third direction is substantially perpendicular to the first direction and the second direction.

3. The hollow hinge according to claim 2, wherein the spherical element is connected to the elastic element.

4. The hollow hinge according to claim 1, wherein one end portion of the first rotating member is sleeved in an opening of the second rotating member.

5. An electronic device, comprising:
a first housing;
a second housing, disposed opposite to the first housing; and
a hollow hinge, pivotally disposed between the first housing and the second housing, the hollow hinge comprising:
a first hollow component, having a first surface and a second surface opposite to the first surface, a plurality of concave portions being disposed on the second surface;
a second hollow component, disposed on the second surface of the first hollow component, a plurality of receiving portions corresponding to the concave portions being disposed on the second hollow component;
a first rotating member, being disposed at the first hollow component, and having two first wing portions extending outward from a body of the first rotating member along a first direction, such that the two first wing portions align with each other along the first direction;
a second rotating member, being disposed at the second hollow component, and having two second wing portions extending outward from a body of the second rotating member along a second direction different from the first direction, wherein the body of the first rotating member is sleeved by the second rotating member, and the first hollow component and the second hollow component are driven and rotated by the first rotating member and the second rotating member; and
a plurality of support assemblies, accommodated in the receiving portions, respectively, one end portion of each of the plurality of support assemblies butting against the first hollow component through a force, the end portion of each of the plurality of support assemblies butting one of the plurality of concave portions in an initial state,
wherein the plurality of concave portions are arranged in a polygonal shape, the first direction is parallel to at least one side of the polygonal shape, and the second direction is parallel to at least one other side of the polygonal shape.

6. The electronic device according to claim 5, wherein the first hollow component is disposed at the first housing, and the second hollow component is disposed at the second housing.

7. The electronic device according to claim 5, wherein each of the plurality of support assemblies comprises an elastic element and a spherical element, the elastic element provides the force, and the spherical element butts against the first hollow component along a third direction, wherein the third direction is substantially perpendicular to the first direction and the second direction.

8. The electronic device according to claim 7, wherein the spherical element is connected to the elastic element.

9. The electronic device according to claim 5, wherein one end portion of the first rotating member is sleeved in an opening of the second rotating member.

* * * * *